US009535821B1

(12) United States Patent
Delarue et al.

(10) Patent No.: US 9,535,821 B1
(45) Date of Patent: Jan. 3, 2017

(54) DISPLAYING VIOLATED CODING RULES IN SOURCE CODE

(71) Applicant: The MathWorks, Inc., Natick, MA (US)

(72) Inventors: David Delarue, St. Martin D'heres (FR); Olga Voronina, Lexington, MA (US); Claire Treille, Grenoble (FR)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/788,638

(22) Filed: Jun. 30, 2015

Related U.S. Application Data

(63) Continuation of application No. 13/693,413, filed on Dec. 4, 2012, now Pat. No. 9,081,595.

(60) Provisional application No. 61/567,231, filed on Dec. 6, 2011.

(51) Int. Cl.
*G06F 9/44* (2006.01)
*G06F 11/36* (2006.01)
*G06F 9/445* (2006.01)

(52) U.S. Cl.
CPC ....... *G06F 11/3664* (2013.01); *G06F 9/44589* (2013.01); *G06F 11/3612* (2013.01); *G06F 11/3616* (2013.01)

(58) Field of Classification Search
CPC .. G06F 11/3664; G06F 11/3668; G06F 11/323
USPC ...................................................... 717/125
See application file for complete search history.

(56) References Cited

U.S. PATENT DOCUMENTS

| 6,473,896 | B1 | 10/2002 | Hicken et al. |
| 6,944,508 | B2 | 9/2005 | Watanabe et al. |
| 8,336,030 | B1* | 12/2012 | Boissy ...................... G06F 8/71 717/122 |
| 8,719,790 | B2 | 5/2014 | Ghorbal et al. |
| 8,745,586 | B1* | 6/2014 | Boissy .................. G06F 11/368 717/122 |
| 8,881,116 | B2 | 11/2014 | Mulat |
| 9,081,595 | B1 | 7/2015 | Delarue et al. |
| 2005/0015675 | A1* | 1/2005 | Kolawa ............... G06F 11/3688 714/38.14 |
| 2005/0066234 | A1* | 3/2005 | Darringer ........... G06F 11/3688 714/38.1 |
| 2006/0282807 | A1* | 12/2006 | Ivancic ............... G06F 11/3608 716/106 |
| 2010/0198799 | A1 | 8/2010 | Krishnan et al. |
| 2012/0210173 | A1* | 8/2012 | Schloegel ........... G06F 11/3608 714/37 |
| 2012/0233599 | A1 | 9/2012 | Valdiviezo Basauri et al. |

(Continued)

FOREIGN PATENT DOCUMENTS

WO  WO 2012168755  12/2012

*Primary Examiner* — John Chavis
(74) *Attorney, Agent, or Firm* — Harrity & Harrity, LLP

(57) ABSTRACT

A device performs a verification analysis of source code, where the verification analysis includes a coding rules check of the source code based on coding standards, and run-time error check of the source code. The device provides, for display, results of the coding rules check of the source code, and provides, for display, results of the run-time error check of the source code. The device provides, for display, from the results of the coding rules check of the source code, at least one of a coding rule error violation associated with the source code, or a coding rule warning violation associated with the source code.

20 Claims, 16 Drawing Sheets

(56) References Cited

U.S. PATENT DOCUMENTS

| | | |
|---|---|---|
| 2012/0246626 A1 | 9/2012 | Ghorbal et al. |
| 2012/0317554 A1 | 12/2012 | Mulat |
| 2013/0145347 A1 | 6/2013 | Karr et al. |
| 2013/0159964 A1 | 6/2013 | Szpak |
| 2013/0232343 A1* | 9/2013 | Horning ................. G06F 21/14 713/190 |
| 2014/0229922 A1 | 8/2014 | Valdiviezo Basauri et al. |

* cited by examiner

FIG. 6

| Rules | Error | Warning | Off |
|---|---|---|---|
| 2. Language extensions | | | |
| 2.1 Assembly language shall be encapsulated and isolated | | ● | ○ |
| 2.2 source code shall only use /* ... */ style comments | ○ | ● | ○ |
| 2.3 The character sequence /* shall not be used within a comment | ● | ○ | ○ |

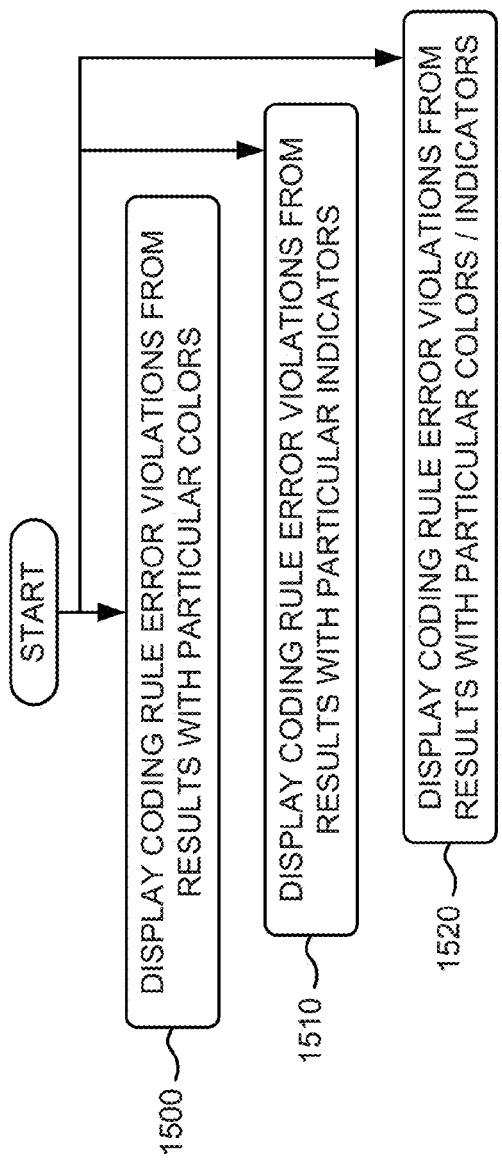

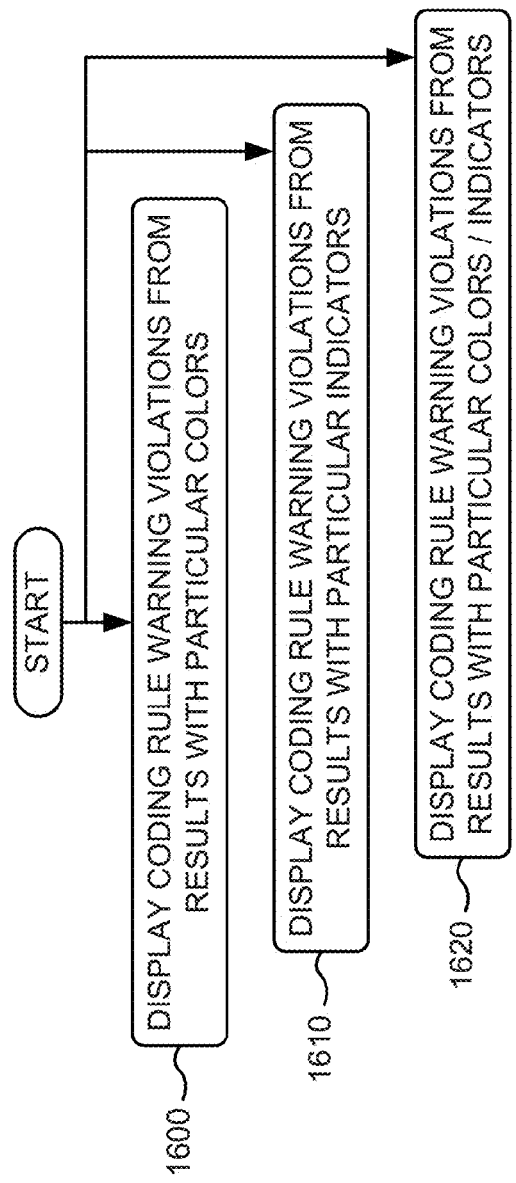

DISPLAYING VIOLATED CODING RULES IN SOURCE CODE

RELATED APPLICATION

This application is a continuation of U.S. patent application Ser. No. 13/693,413, filed Dec. 4, 2012, (now U.S. Pat. No. 9,081,595), which claims priority under 35 U.S.C. §119 based on U.S. Provisional Patent Application No. 61/567,231, filed Dec. 6, 2011, the disclosures of which are incorporated by reference herein in their entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 6 is a diagram of another example coding rules checker configuration user interface that may be generated or provided by the software verification tool;

FIGS. 12-16 are flow charts of an example process for displaying violated coding rules in source code according to an implementation described herein.

DETAILED DESCRIPTION

Figure 1:
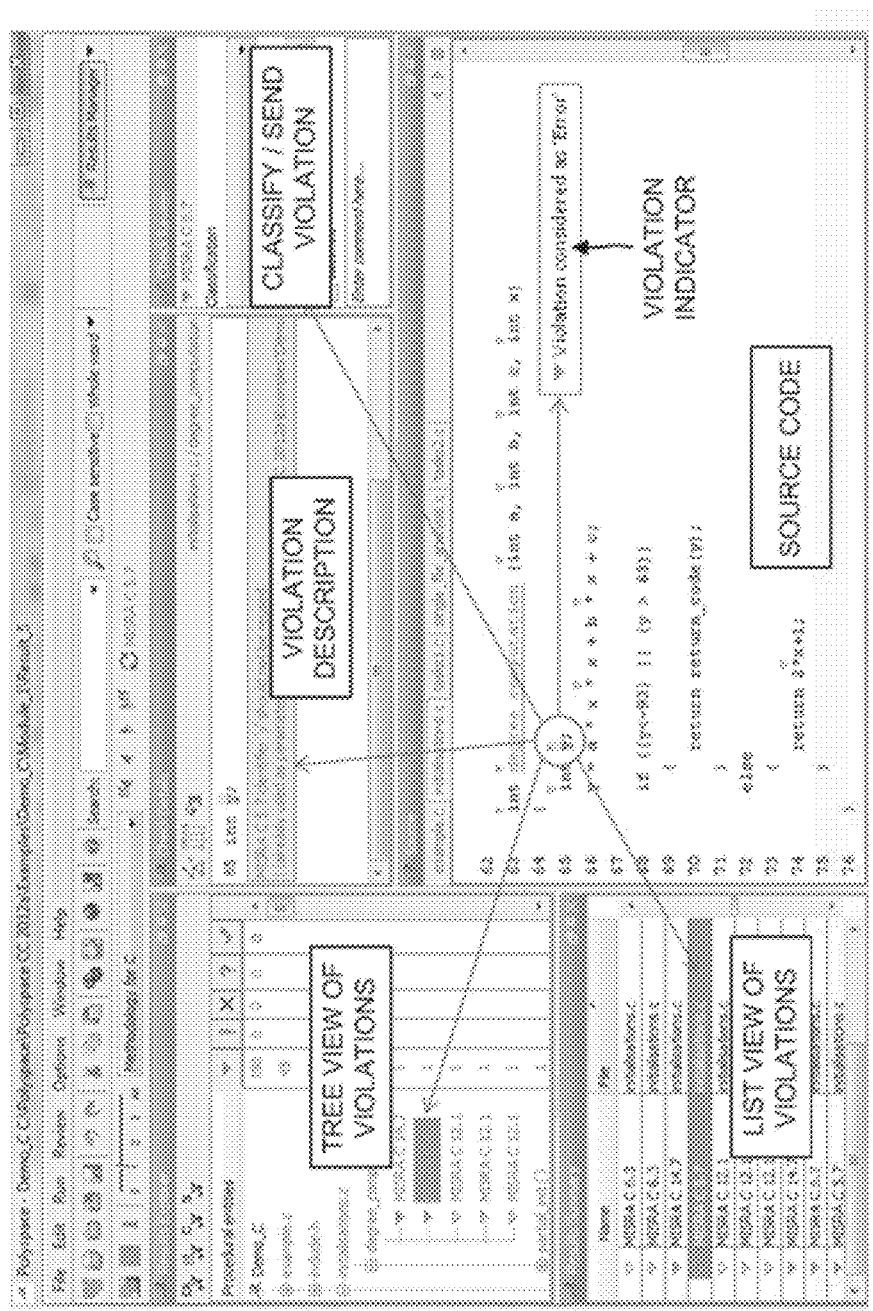
FIG. 1 is a diagram of an overview of an example implementation described herein.

The following detailed description refers to the accompanying drawings. The same reference numbers in different drawings may identify the same or similar elements.

Software products can potentially be very large and complex. Software testing is the process used to measure the quality of developed computer software. Quality may be judged based on a number of metrics, such as correctness, completeness, reliability, number of bugs found, efficiency, compatibility, etc.

The amount of testing required for a particular software project frequently depends on the target for the deployed software. A developer of game software intended for personal computers, for example, may devote relatively little resources to formal testing of the software. In contrast, the developer of a mission critical application in the healthcare, automotive, or utility industries may require a much more rigorous level of software testing.

One technique for testing software is based on the concept of static verification of the software code. Static code verification is an analysis performed without executing the software. Static verification of software code can prove, for example, which operations are free of run-time errors, such as numeric overflows, divisions by zero, buffer overflows, or pointer issues, and identify where run-time errors will or might occur.

In one example system, static verification is used to classify the code into categories. The categories may include code determined to be good, safe, or correct; code determined to have errors; code determined not to be accessible (e.g., dead code or deactivated code); and code for which an error may be present but for which the error could not be conclusively determined ("possible error" code). Code classified as a "possible error" represents code that the static verification system could not conclusively determine as including an error. A developer faced with a "possible error" code may be required to manually review the code to determine whether the code will actually cause an error and, if so, to determine what section of the code is the underlying cause of the error.

Overview

Systems and/or methods described herein may provide an automated software verification tool that verifies software code (e.g., source code) by detecting coding rules violations and run-time errors. The systems and/or methods may analyze the source code to demonstrate compliance with established coding standards, such as, for example, MISRA C coding standards (MISRA-C:2004), MISRA AC AGC for automatic code generation (MISRA AC AGC:2007), MISRA C++ coding standards (MISRA C++:2008), and Joint Strike Fighter Air Vehicle C++ coding standards (JSF++:2005). To verify the source code, a user of the software verification tool may set up verification parameters in a project, execute the verification, and review the results. A graphical user interface provided by the software verification tool may help to efficiently configure a project, perform verification, and review verification results. The software verification tool may include a coding rules checker that may help users to improve the quality of the source code.

FIG. 1 is a diagram of an overview of an example implementation described herein. As shown, the software verification tool may provide a graphical user interface that includes multiple windows or panels. The windows may include, for example, a tree view of violations window, a list view of violations window, a violation description window, a classify/send violation window, and a source code window.

The tree view of violations window (also referred to as a results explorer section) may provide a tree view of results of coding rules checks and/or run-time checks that the software verification tool located in the source code. The tree view may include names of procedures in the source code and indications of the types of violations in the procedures.

The list view of violations window (also referred to as a results summary section) may provide a list view of results of coding rules checks and/or run-time checks that the software verification tool located in the source code. The list view may include names of coding standards (e.g., MISRA C) that are violated by files associated with the source code.

The violation description window (also referred to as a check details section) may provide descriptions of results of coding rules checks and/or run-time checks that the software verification tool located in the source code. In one example, the violation description window may provide a description of a violation selected by a user (e.g., a developer) of the software verification tool.

The classify/send violation window (also referred to as a check review section) may enable the user of the software verification tool to classify, define status, and comment on coding rules, run-time checks, and/or run-time violations, and send such information to another user.

The source code window (also referred to as a source section) may provide the source code verified by the software verification tool. The source code window may include indications that highlight coding rules, run-time checks, and/or run-time violations that the software verification tool located in the source code. For example, the source code window may provide a particular violation indicator (e.g., a solid colored triangle) for a violation determined to be a coding rule error.

The term "source code," as used herein, is to be broadly construed to include program instructions of a programming language (e.g., a C programming language, a C++ programming language, a Pascal programming language, etc.) that may be provided in a predetermined format and/or style, and/or may include source code that uses fixed-point and/or floating-point real number representations. Alternatively, or additionally, the source code may include graphical code (e.g., Unified Modeling Language (UML) code, Statecharts code, etc.), model-based code (e.g., a block diagram), etc. One or more portions of the source code may be automatically generated.

Example Environment Arrangement

Figure 2:
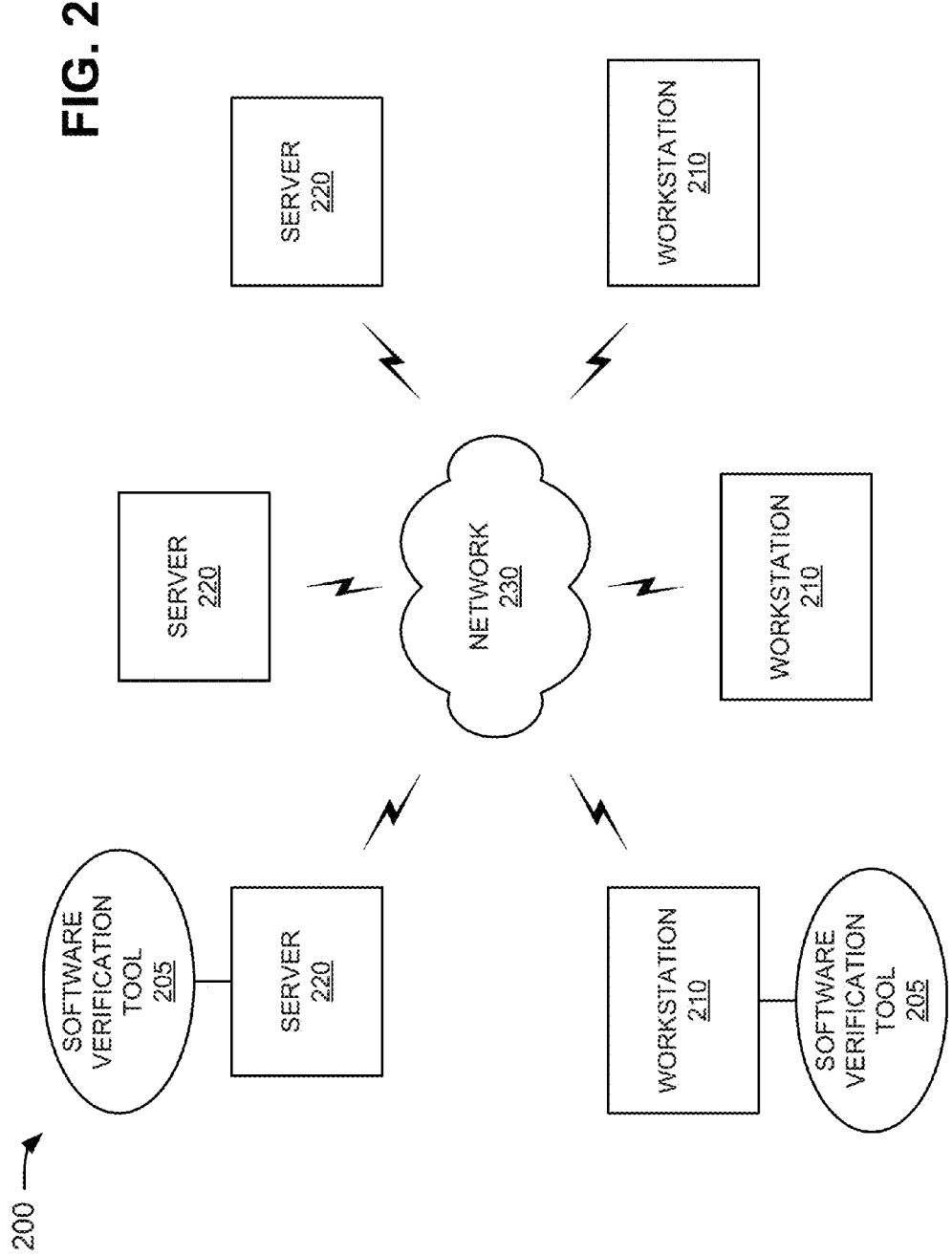
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more workstations 210 and one or more servers 220 connected by a network 230. A software verification tool 205 may be executed by one or more of workstations 210 and/or servers 220 to assist in software verification. Components of environment 200 may connect via wired and/or wireless connections. Two software verification tools 205, three workstations 210, three servers 220, and one network 230 have been illustrated in FIG. 2 for simplicity.

Software verification tool 205 may assist software developers (e.g., users) in verifying developed software code. In one example implementation, as shown in FIG. 2, software verification tool 205 may include client-side components and server-side components. The client-side components may be executed at one or more of workstations 210 while the server-side components may execute at one or more of servers 220. Alternatively, or additionally, depending on the size of the source code to be verified, software verification tool 205 may execute exclusively at workstation 210. In one example, software verification tool 205 may verify software that is being designed, on workstation 210, for a target machine. The target machine may be a device, such as a cellular phone, a medical device, an embedded device, or another device that is to execute the software being developed by a developer. In these situations, software verification tool 205 may include options so that, when verifying the software for the target machine, software verification tool 205 can simulate the environment of the target machine. For example, for an embedded system that uses a 16-bit processor, the value of certain variables, such as an integer, may be verified as a 16-bit value, even though the workstation 210 at which the software is being developed may use a 32-bit or a 64-bit processor.

Workstations 210 may generally include any computing device at which software may be developed, such as desktop computers, laptop computers, tablet computers, smart phones, etc., that may be used for general computing tasks. In one example implementation, workstations 210 may execute a technical computing environment (TCE) that presents a user with an interface that enables efficient analysis and generation of technical applications. For example, the TCE may provide a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, the TCE may include a dynamically-typed programming language (e.g., the M language or MATLAB® language) that can be used to express problems and/or solutions in mathematical notations. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

Servers 220 may each include a device, such as a computer or another type of computation and communication device. Server 220 may generally provide services to other devices (e.g., workstations 210) connected to network 230. In one example, one or more of servers 220 may include server components of software verification tool 205.

Network 230 may include any type of network, such as a local area network (LAN), a wide area network (WAN), a telephone network (e.g., the Public Switched Telephone Network (PSTN) or a cellular network), an intranet, the Internet, or a combination of networks.

Although FIG. 2 shows example components of environment 200, in other implementations, environment 200 may contain fewer components, different components, differently arranged components, and/or additional components than those depicted in FIG. 2. Alternatively, or additionally, one or more components of environment 200 may perform one or more tasks described as being performed by one or more other components of environment 200.

Example Device Architecture

Figure 3:
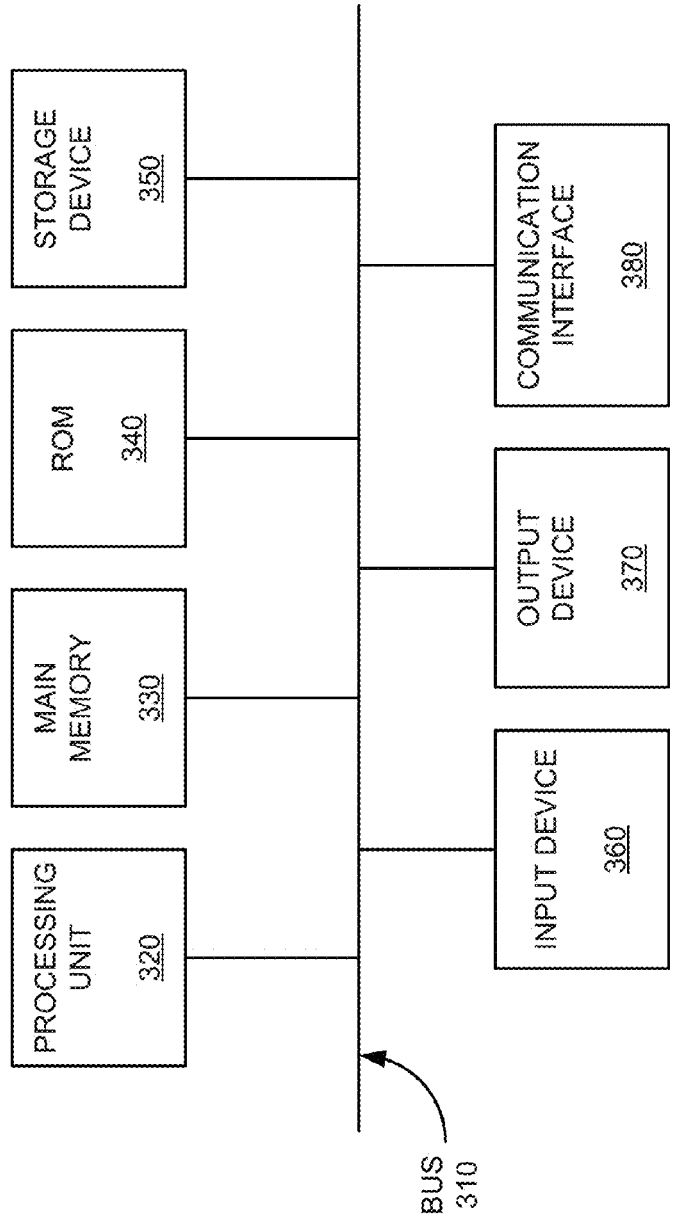
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and instructions for execution by processing unit 320. ROM 340 may include one or more ROM devices or other types of static storage devices that may store static information and/or instructions for use by processing unit 320. Storage device 350 may include a magnetic, solid state, and/or optical recording medium and its corresponding drive.

Input device 360 may include a mechanism that permits a user to input information to device 300, such as a keyboard, a mouse, a pen, a microphone, voice recognition and/or biometric mechanisms, a remote control, a touch screen, etc. Output device 370 may include a mechanism that outputs information from device 300, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Software Verification Tool Architecture

As previously mentioned, software verification tool 205 may be used to measure the quality of developed computer software and assist users in locating errors ("bugs") in the computer software.

In one implementation, software verification tool 205 may be used in the context of a technical computing environment (TCE), described above. Software verification tool 205 may operate as a component in a TCE to verify code created with the TCE. For example, the TCE may give the user an option, such as through a graphical interface, to create models. The TCE may then compile the created models for execution on a target system. Software verification tool 205 may be used to verify the code that embodies the models. The code that embodies the models may be automatically generated from the models by the TCE. To automatically generate the code, the TCE may infer attributes of elements in the models, for example, in case the attributes are not explicitly specified, set to be inherited, or set to a default value. Example attributes may include sample time, data type, whether a variable has an imaginary component, dimensions, etc.

Alternatively, or additionally, software verification tool 205 may be used with substantially any software development project and/or in any type of computing environment. For example, software verification tool 205 may, but is not limited to, analyze code written in a conventional programming language, such as C++, C and Ada, and which is produced manually by a developer with no use of a TCE. In addition, software verification tool 205 can be used in standalone environments, distributed environments, heterogeneous computing environments, homogeneous computing environments, etc.

Figure 4:
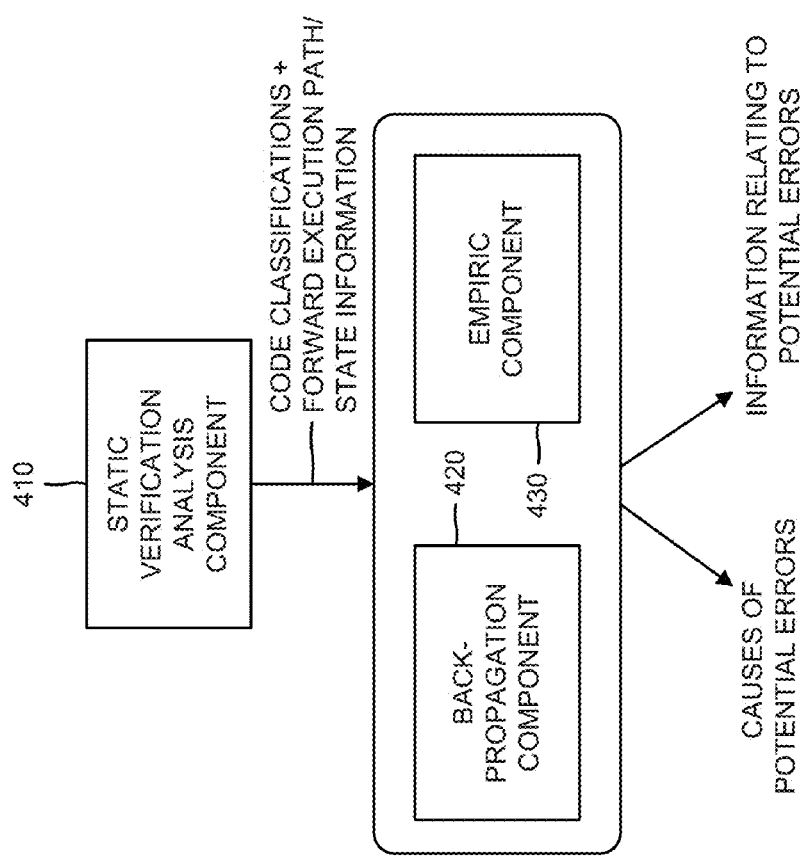
FIG. 4 is a diagram of example functional components of a software verification tool depicted in FIG. 2.

FIG. 4 is a diagram of example functional components of software verification tool 205. In one implementation, the functions described in connection with FIG. 4 may be performed by one or more components of device 300 (FIG. 3) and/or by one or more devices 300. As shown in FIG. 4, software verification tool 205 may include a static verification analysis component 410, a back-propagation component 420, and an empiric component 430.

Static verification analysis component 410 may perform a static verification analysis of input software code (e.g., source code). The static verification may be performed using abstract interpretation. Static verification techniques may be based on automatically determining properties of some or all possible execution paths, of the input software code, in some or all possible execution environments. During static verification, static verification analysis component 410 may keep track of a number of states, where each state may be defined by an execution point in the software code and by a set of variable values. In this manner, for a given section of software code, static verification analysis component 410 may keep track of a number of possible execution paths, where each execution path may be defined by a linked graph of nodes, and where each node may represent a state.

In practice, if the execution path for every possible state were considered, the number of possible execution paths and nodes may quickly become computationally infeasible, as the variables in the software code can each individually have many different values (e.g., an eight bit character variable may have 256 possible different values). Static verification analysis component 410 may use abstract interpretation to limit the number of execution paths to a computationally manageable set. Abstract interpretation may refer to the approximation of mathematical structures, such as the variables in the software code, by representing the variable states abstractly. A number of different abstract interpretation techniques, called lattices or abstract domains, may be used by static verification component 410. For example, variables in the software code may be approximated using abstract domains, based on the sign of variables, intervals assigned to the variables, linear equalities, difference-bound matrices, etc.

In performing the static verification, static verification analysis component 410 may perform an over-approximation of the possible states. The term over-approximation, as used herein, may refer to an abstract approximation of states in the execution path in which the states are approximated such that all states that may occur during a real execution of the software code are included. The over-approximated states may additionally include states that may never actually occur during real execution of the software code. Over-approximation may be useful when testing soundness of software code.

Static verification analysis component 410 may determine whether operations in the code are associated with an error. For example, static verification analysis component 410 may perform an analysis, using execution paths calculated through over-approximation of the abstract values, to determine which operations (i.e., code points) are free of run-time errors or contain possible errors. Errors that may be found include, for example: overflows and underflows; divisions by zero and other arithmetic errors; out-of-bounds array access; illegally de-referenced pointers; read access to non-initialized data; dangerous data type (e.g., floating point, integer, etc.) conversions; dead code; access to null pointers; dynamic errors related to object programming and inheritance; errors related to exception handling; non-initialized class members in C++ language; and/or impossible entry point synchronization errors. Impossible entry point synchronization may refer to errors in the synchronization of two concurrent tasks.

As a result of the static analysis, static verification analysis component 410 may classify the code into classifications that relate to possible errors in the code. In one example implementation, the classification may include classifying each possible failure point in the source code into classes that define, for example: code that has no errors, code that may possibly include errors (unknown or unproven conditions), code that definitely has errors (i.e., with certainty), or code that cannot be reached. The classifications may be presented to the user in a number of possible ways, such as by changing the appearance of the code (e.g., font type, font size, font color, highlighting, etc.) based on its classification. In one example implementation, the code may be presented using a color coding scheme. For example, the code may be shown on a display in a GREEN color (code that has no errors), a RED color (code that definitely has errors in all possible dynamic execution paths), a GREY color (code that cannot be reached), or an ORANGE color (unknown or unproven error conditions and/or a mix of situations that include GREEN code in some situations and RED code in others).

Static verification analysis component 410 may also return the execution path/state information for the static verification. For example, static verification analysis component 410 may store the state graphs associated with each of the determined execution paths.

Back-propagation component 420 may traverse the execution paths determined by static verification analysis component 410, in a backwards direction (i.e., back-propagation) to determine causes of errors or possible errors found in the software code by static verification component 410 (i.e., during the forward propagation through the execution paths, as performed by static verification analysis component 410). Back-propagation component 420 may perform the back-propagation beginning from states that correspond to errors or potential errors (e.g., ORANGE code). The determined causes of the potential errors may be, for example, output to a display, transmitted over a network, and/or saved.

Empiric component 430 may provide additional information relating to the potential errors. The additional information may be used to assist in the classification of the potential errors. Empiric component 430 may generally operate on semantic information obtained from the software code.

The potential error causes, when output, may be associated with an error category to assist the developer in understanding the error and determining whether the error needs to be fixed. For example, error causes may be categorized as: (1) "contextual," which may mean that the cause is inside of an analyzed section of code; (2) "robustness," which may mean that the cause is because of an input for the analyzed code (i.e., the cause comes from outside of the analyzed code); and (3) "robustness with data range specifications," which may mean that the cause is an input that has been defined, by the developer, to a range.

The categories assigned to the potential causes may be used by a developer in deciding which potential errors should be further investigated and/or how to prioritize the investigation of the potential errors. This information may thus be used by the developer in handling information relating to the potential errors.

In one example implementation, software verification tool 205 may provide a correlation between coding rules and static analysis errors. Software verification tool 205 may gather statistics on this correlation, and may present the statistics to a user. The statistics may be used by software verification tool 205 to suggest source code changes in response to a static analysis error based on a correlated code rule(s). Software verification tool 205 may present, to a user, coding rules that are correlated with a static analysis error (e.g., to filter out other coding rules that might have been active). Alternatively, or additionally, software verification tool 205 may automatically change the source code so as to satisfy coding rules. Software verification tool 205 may provide coverage analysis results (e.g., to help prioritize violations, warning, errors, etc. for the user).

Although FIG. 4 shows example of functional components of software verification tool 205, in other implementations, software verification tool 205 may contain fewer functional components, different functional components, differently arranged functional components, and/or additional functional components than those depicted in FIG. 4. Alternatively, or additionally, one or more functional components of software verification tool 205 may perform one or more other tasks described as being performed by one or more other functional components of software verification tool 205.

Example Software Verification Tool User Interfaces

Figure 5:
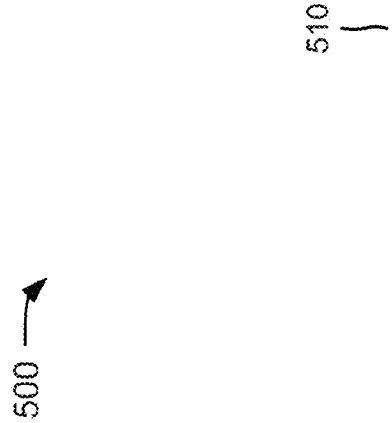
FIG. 5 is a diagram of an example coding rules checker configuration user interface that may be generated or provided by the software verification tool.

FIG. 5 is a diagram of an example coding rules checker configuration user interface 500 that may be generated or provided by software verification tool 205. User interface 500 depicted in FIG. 5, as well as user interfaces 600-1100 depicted in FIGS. 6-11 (hereinafter referred to collectively as "the user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), or may not be user-configurable. Information associated with the user interfaces may be selected and/or manipulated by a user of workstation 210 and/or server 220 (e.g., via a touch screen display, a mouse, a keyboard, a keypad, voice commands, visual commands, etc.).

Software verification tool 205 may determine whether source code complies with specific coding rules. While performing code verification, software verification tool 205 may simultaneously enable a user to create a project and specify coding standards via user interface 500 of FIG. 5.

For example, a user may specify coding standards, such as MISRA C coding standards, MISRA C++ coding standards, and JSF coding standards, for a coding rules checker field 510.

After specifying the coding standards, software verification tool 205 may present another coding rules checker configuration user interface 600, as depicted in FIG. 6, which enables the user to input individual rules 610 defined by the coding standards or a custom subset of the coding standards. For each rule 610, the user may specify an error state 620, a warning state 630, and an off state 640. Error state 620 may cause a compile phase of the source code to stop when a corresponding rule 610 is violated. When a corresponding rule 610 is violated, warning state 630 may cause a warning message to be displayed, but verification of the source code may continue. Off state 640 may indicate that a corresponding rule 610 is not checked.

Figure 7:
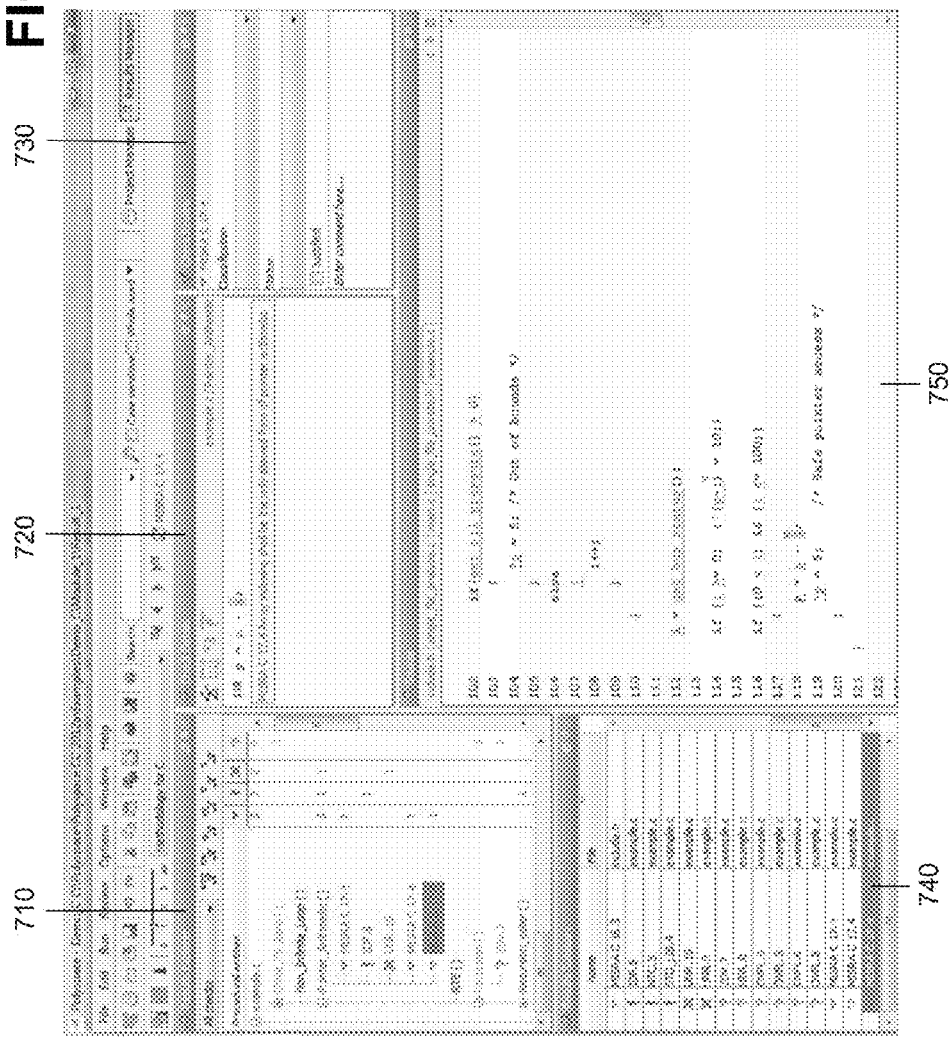
FIG. 7 is a diagram of an example results manager user interface that may be generated or provided by the software verification tool.

Software verification tool 205 may perform coding rules checking of the source code, before, after, or while checking the source code for run-time errors, and may report any errors or warnings in a results manager user interface 700, as depicted in FIG. 7. User interface 700 may provide a color coding scheme that may help users to quickly identify coding rules and/or run-time violations and to find an exact location of an error in the source code. User interface 700 may permit review of results from a coding rules checker of software verification tool 205, which may ensure compliance with established coding standards.

As further shown in FIG. 7, user interface 700 may include a results explorer section 710, a check details section 720, a check review section 730, a results summary section 740, and a source code section 750. Each of sections 710-750 may provide a different view of the coding rules checker results and may aid in reviewing the results (e.g., including coding rules and run-time checks).

Results explorer section 710 may include a hierarchical or tree view of a list of checks for each function of each file in source code. Results explorer section 710 may provide a tree view of results of coding rules checks and/or run-time checks that software verification tool 205 located in the source code. The tree view may include names of procedures in the source code and indications of the types of violations in the procedures.

Check details section 720 may include details about a selected check. Check details section 720 may provide descriptions of results of coding rules checks and/or run-time checks that software verification tool 205 located in the source code. In one example, check details section 720 may provide a description of a violation selected by a user (e.g., a developer) of software verification tool 205.

Check review section 730 may permit review of checks so that the user may classify, define a status, and comment on a selected check or a multi-check selection. Check review section 730 may enable the user of software verification tool 205 to classify coding rules violations and/or results of checks for run-time violations, and share the classified violations with another user.

Results summary section 740 may include a tabular or list view of a list of checks for each function of each file in a project. Results summary section 740 may provide a list view of results of coding rules checks and/or run-time checks that software verification tool 205 located in the source code. The list view may include names of coding standards (e.g., MISRA C) that are violated by files associated with the source code.

Source code section 750 may include the source code for a selected check in results explorer section 710 and results summary section 740. Source code section 750 may include indications that highlight results of coding rules checks and/or run-time checks that software verification tool 205 located in the source code. For example, source code section 750 may provide a particular violation indicator or identifier (e.g., a solid colored triangle) for a violation determined to be a coding rule error. In one example, the source code provided in source code section 750 may include a hypertext markup language (HTML) reproduction of the actual source code. Unidirectional or bidirectional links between reproduced and actual source code representations may provide a means to navigate between the representations.

Software verification tool 205 may utilize color coding of results to enable users to quickly identify errors (e.g., coding rules violations and/or run-time errors). Alternatively, or additionally, software verification tool 205 may utilize different identifiers to identify different errors (e.g., coding rules violations and/or run-time violations) in the source code. Software verification tool 205 may assign a color of the most severe error found in a function and/or a file to functions and/or files in results explorer section 710. In one example implementation, the colors may be applied in the following order (from greatest chance of error to least chance of error): Red to Grey to Orange to Purple to Green. For example, software verification tool 205 may utilize the following color coding scheme and/or identifiers to identify coding rules violations and/or run-time violations.

| Check | Color | Identifier | Description |
|---|---|---|---|
| Run-Time | Green | ✓ | Code that never has an error |
| | Red | ! | Code that always has an error |
| | Grey | × | Unreachable code |
| | Orange | ? | Unproven code (code that may have an error) |
| Coding Rules | Purple | ∇ | Coding Rules violations considered as 'Warning' |
| | | ▼ | Coding Rules violations considered as 'Error' |

Alternatively, or additionally, software verification tool 205 may utilize a different color coding scheme and/or identifiers to identify coding rules violations and/or run-time violations.

Figure 8:
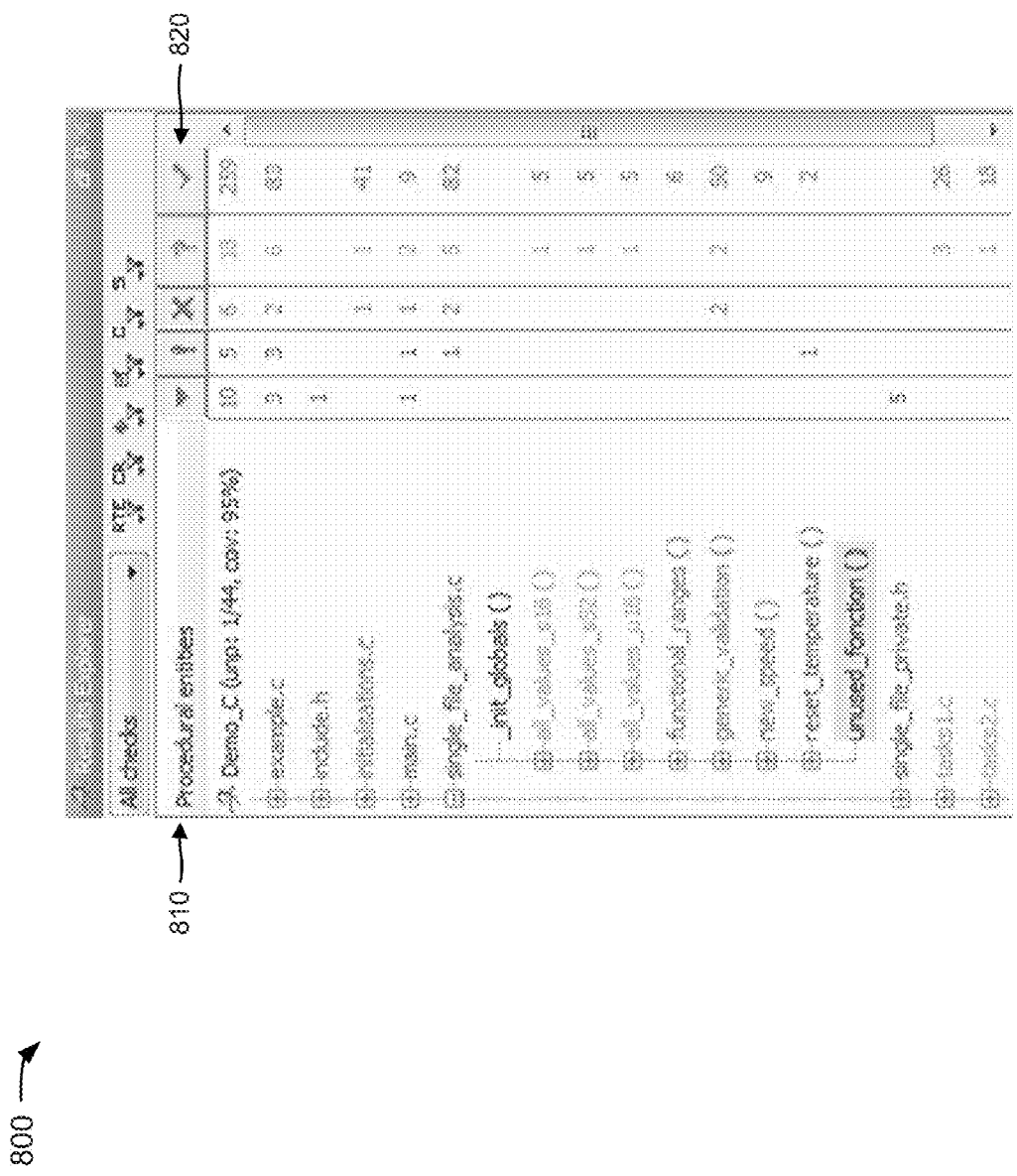
FIG. 8 is a diagram of an example results explorer user interface that may be generated or provided by the software verification tool.

As shown in FIG. 8, the example color coding scheme may be provided in a results explorer user interface 800, which may correspond to results explorer section 710 (FIG. 7). As shown, user interface 800 may include a list of procedural entities 810 and corresponding identifiers 820. For example, procedural entity 810 "example.c" may include "83" instances of code that never have an error, as indicated by the green checkmark identifier 820.

Color coding of results by software verification tool 205 may help a user to quickly identify violations and spend less time debugging the source code. For example, the exact location of a violation may be visible in the source code and/or superimposed on a source code representation, which may make it easier to locate a problem, understand a problem, and/or fix a problem. Software verification tool 205 may enable a user to review results from the coding rules checker and to ensure compliance with established coding standards.

Figure 9:
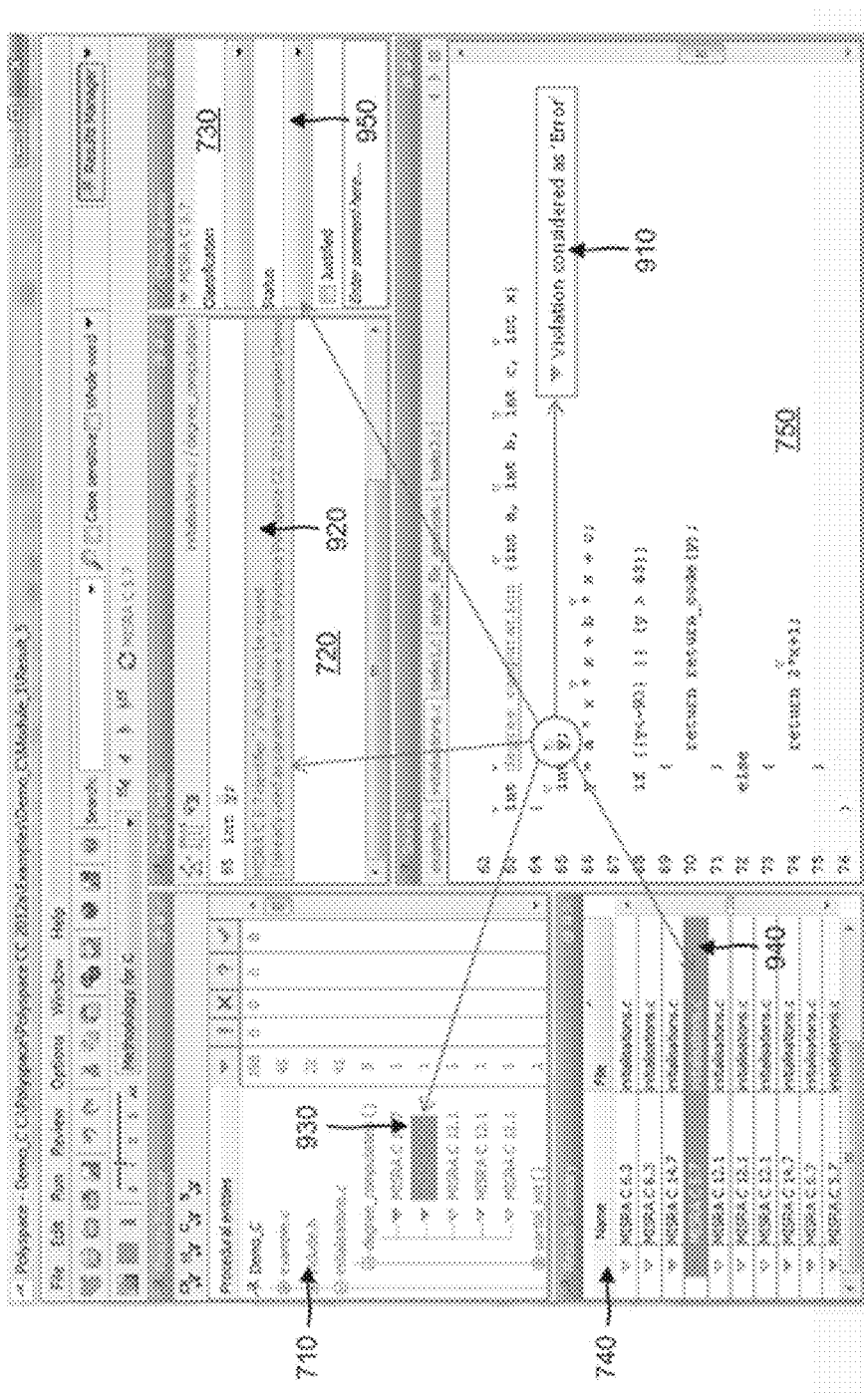
FIG. 9 is a diagram of another example results manager user interface that may be generated or provided by the software verification tool.

When some violations, considered as an error, are detected, software verification tool 205 may end the verification after the compile phase and may not perform run-time checks. In such a situation, software verification tool 205 may display the list of violations via a results manager user interface 900, as depicted in FIG. 9. Source code section 750 of user interface 900 may display the source code with a coding rules violation 910 highlighted and localized with a filled purple upside down triangle. Check details section 720 of user interface 900 may display information about the selected check, as indicated by reference number 920. Results explorer section 710 and results summary section 740 of user interface 900 may highlight a selected check, as indicated by reference numbers 930 and 940, respectively. Check review section 730 of user interface 900 may permit a user to classify the check according to a severity, define a status for the check, and comment on the check, as indicated by reference number 950.

Figure 10:
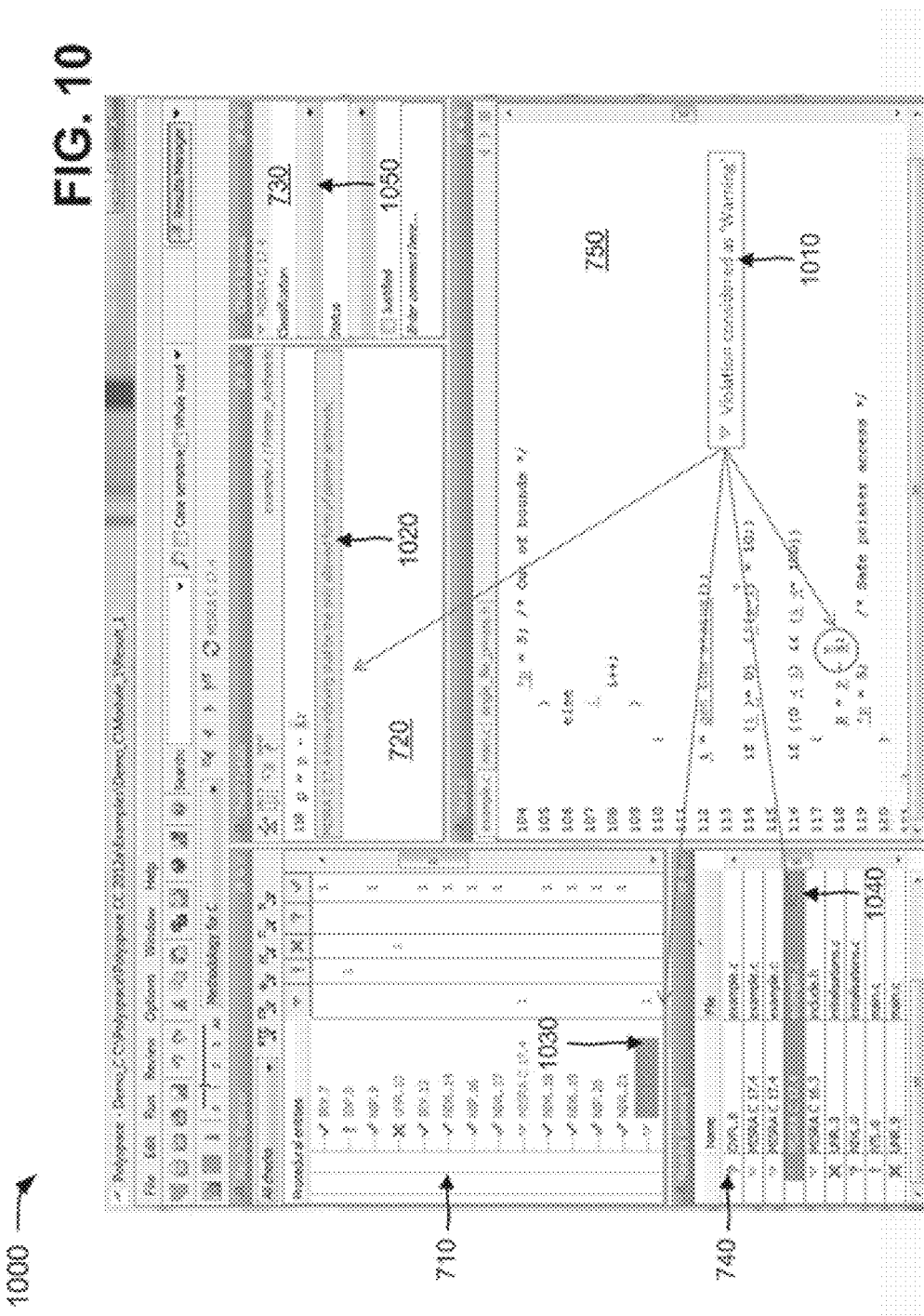
FIG. 10 is a diagram of still another example results manager user interface that may be generated or provided by the software verification tool.

When some violations, considered as a warning, are detected, software verification tool 205 may continue the verification after the compile phase and may perform run-time checks. In such a situation, software verification tool 205 may display coding rules violations and run-time checks via a results manager user interface 1000, as depicted in FIG. 10. Source code section 750 of user interface 1000 may display the source code with a coding rules violation 1010 highlighted and localized with an outlined purple upside down triangle. Check details section 720 of user interface 1000 may display information about the selected check, as indicated by reference number 1020. Results explorer section 710 and results summary section 740 of user interface 1000 may highlight a selected check, as indicated by reference numbers 1030 and 1040, respectively. Check review section 730 of user interface 1000 may permit a user to classify the check according to a severity, define a status for the check, and comment on the check, as indicated by reference number 1050.

Figure 11:
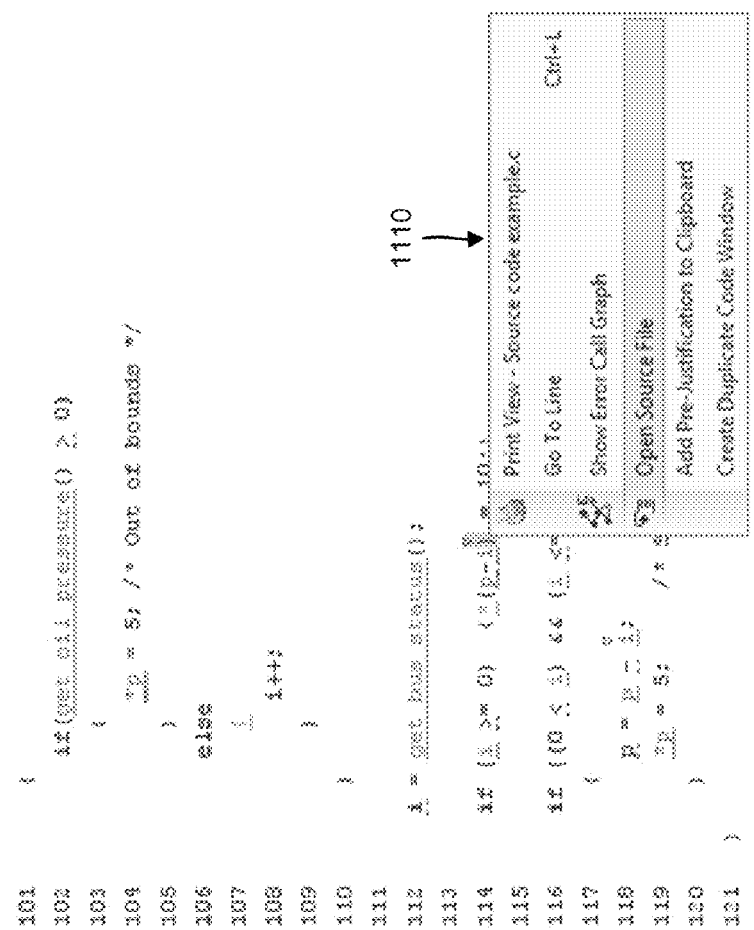
FIG. 11 is a diagram of an example source code user interface that may be generated or provided by the software verification tool.

FIG. 11 is a diagram of an example source code user interface 1100 that may be generated or provided by software verification tool 205. In one example, source code user interface 1100 may correspond to source code section 750 (FIG. 7) or source code sections 750 depicted in FIGS. 9 and 10. Source code user interface 1100 may permit a user to open the source code, containing a coding rule violation, with a text editor. The user may utilize user interface 1100 to edit the coding rule violation provided in the source code. The user may select (e.g., via right clicking with a mouse device or via some other selection mechanism) a violation, and user interface 1100 may display a context menu 1110. Context menu 1110 may provide options that help to examine violations and that allow opening of the source code. For example, context menu 1110 may enable the user to go to a particular line of the source code, to show an error call graph, etc.

Although user interfaces 500-1100 depict a variety of information, in other implementations, user interfaces 500-1100 may depict less information, different information, differently arranged information, and/or additional information than depicted in FIGS. 5-11.

Example Process

FIGS. 12-16 are flow charts of an example process 1200 for displaying violated coding rules in source code according to an implementation described herein. In one implementation, process 1200 may be performed by workstation 210 (e.g., via software verification tool 205). Alternatively, or additionally, process 1200 may be performed by another device or a group of devices (e.g., server 220) separate from or including workstation 210.

Figure 12:
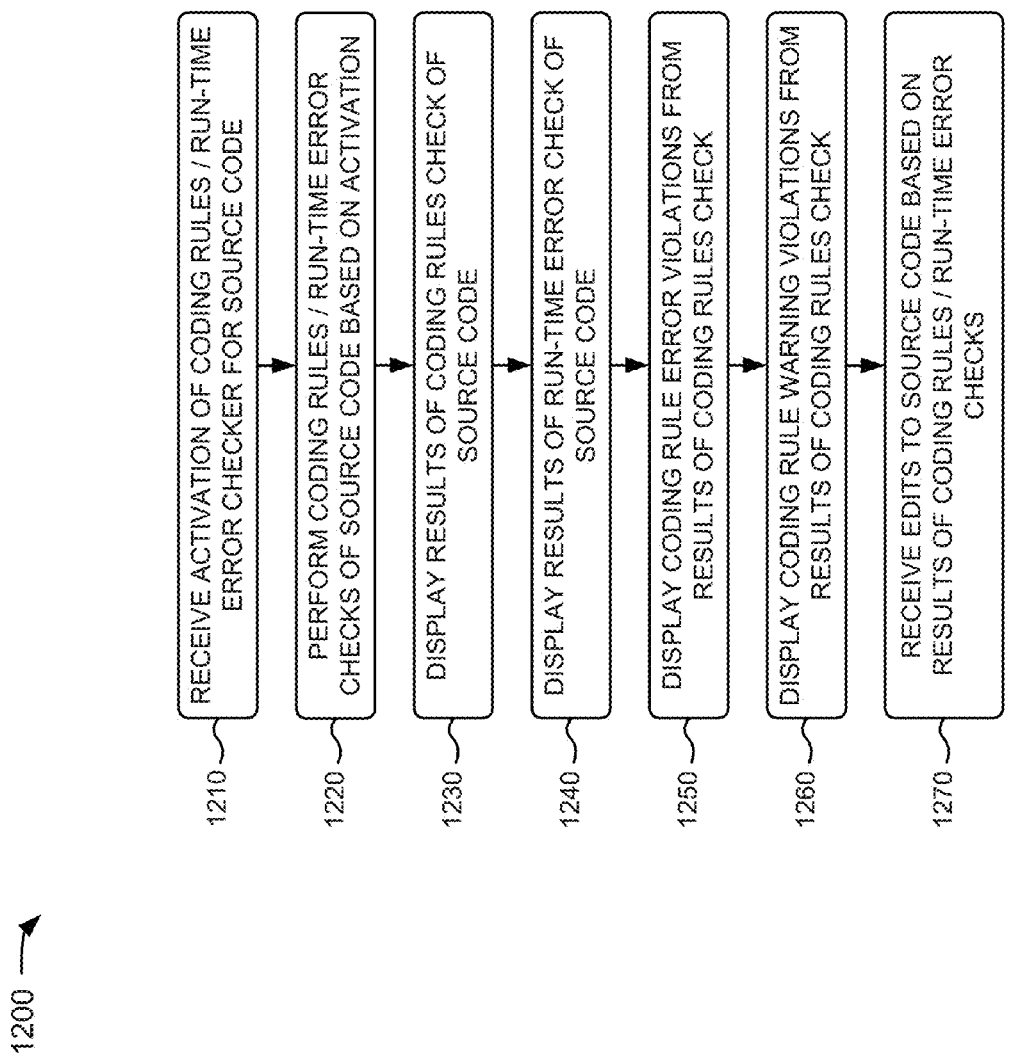

As shown in FIG. 12, process 1200 may include receiving activation of a coding rules checker for source code (block 1210), and performing coding rules and run-time error checks of the source code based on the activation (block 1220). For example, in an implementation described above in connection with FIGS. 5 and 6, software verification tool 205 may enable a user (e.g., via user inputted instructions) to create a project and specify a coding standard via user interface 500. For example, a user may specify coding standards, such as MISRA C coding standards, MISRA C++ coding standards, and JSF coding standards, via a coding rules checker field 510. After selecting the coding standards, software verification tool 205 may present another coding rules checker user interface 600, which enables the user to input individual rules 610 defined by the coding standards or a custom subset of the coding standards. For each rule 610, the user may specify an error state 620, a warning state 630, or an off state 640. Software verification tool 205 may perform coding rules checks and/or run-time error checks of the source code.

As further shown in FIG. 12, process 1200 may include displaying results of the coding rules check of the source code (block 1230), and displaying results of the run-time error check of the source code (block 1240). For example, in an implementation described above in connection with FIGS. 7 and 9, software verification tool 205 may report any errors or warnings in results manager user interfaces 700/900. User interface 700 may provide a color coding scheme that may help users to quickly identify coding rules and/or run-time violations and to find an exact location of an error in the source code. User interface 700 may permit review of results from a coding rules checker of software verification tool 205, which may ensure compliance with established coding standards. User interface 700 may include results explorer section 710, check details section 720, check review section 730, results summary section 740, and source code section 750. User interface 700 may include results of coding rules checks and/or run-time checks (e.g., run-time violations) associated with the source code. The run-time violations may be identified by the color coding scheme and/or by one or more identifiers (e.g., "!", "?", "X", etc.).

Returning to FIG. 12, process 1200 may include displaying coding rule error violations from the results of the coding rules check (block 1250), and displaying coding rule warning violations from the results of the coding rules check (block 1260). For example, in an implementation described above in connection with FIGS. 9 and 10, when some violations, considered as an error, are detected, software verification tool 205 may end the verification after the compile phase and may not perform run-time checks. In such a situation, software verification tool 205 may display the list of violations via results manager user interface 900. Source code section 750 of user interface 900 may display the source code with coding rules violation 910 highlighted and localized with a filled purple upside down triangle. Check details section 720 of user interface 900 may display information about the selected check, as indicated by reference number 920. Results explorer section 710 and results summary section 740 of user interface 900 may highlight a selected check, as indicated by reference numbers 930 and 940, respectively. Check review section 730 of user interface 900 may permit a user to classify the check according to a severity, define a status for the check, and comment on the check, as indicated by reference number 950.

When some violations, considered as a warning, are detected, software verification tool 205 may continue the verification after the compile phase and may perform run-time checks. In such a situation, software verification tool 205 may display results of coding rules checks and/or run-time checks via results manager user interface 1000. Source code section 750 of user interface 1000 may display the source code with coding rules violation 1010 highlighted and localized with an outlined purple upside down triangle. Check details section 720 of user interface 1000 may display information about the selected check, as indicated by reference number 1020. Results explorer section 710 and results summary section 740 of user interface 1000 may highlight a selected check, as indicated by reference numbers 1030 and 1040, respectively. Check review section 730 of user interface 1000 may permit a user to classify the check according to a severity, define a status for the check, and comment on the check, as indicated by reference number 1050.

As further shown in FIG. 12, process 1200 may include receiving edits to the source code based on the results of the coding rules check and/or the run-time error check (block 1270). For example, in an implementation described above in connection with FIG. 11, source code user interface 1100 may permit opening the source code, containing a run-time violation and/or a coding rule violation, with a text editor. The user may utilize user interface 1100 to edit the run-time violation and/or the coding rule violation provided in the source code.

Figure 13:
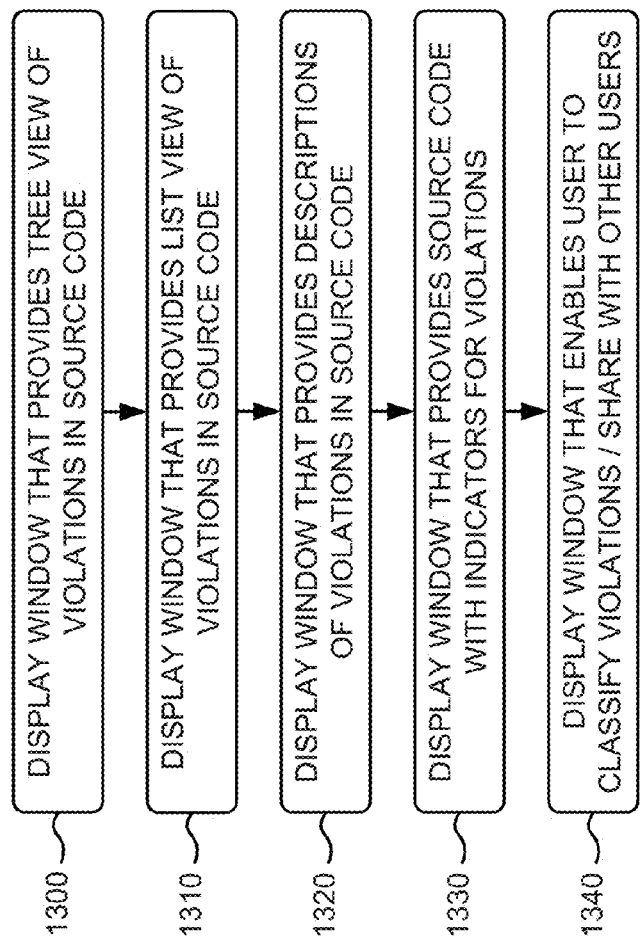

Process block 1230 may include the process blocks depicted in FIG. 13. As shown in FIG. 13, process block 1230 may include displaying a window that provides a tree view of violations in the source code (block 1300), displaying a window that provides a list view of violations in the source code (block 1310), displaying a window that provides descriptions of the violations in the source code (block 1320), displaying a window that provides the source code with indicators for the violations (block 1330), and/or displaying a window that enables a user to classify the violations and share the classified violations with other users (block 1340).

For example, in an implementation described above in connection with FIG. 7, user interface 700 may provide a color coding scheme that may help users to quickly identify coding rules and/or run-time violations and to find an exact location of an error in the source code. User interface 700 may include results explorer section 710, check details section 720, check review section 730, results summary section 740, and source code section 750. Results explorer section 710 may provide a tree view of results of coding rules checks and/or run-time checks that software verification tool 205 located in the source code. Check details section 720 may provide descriptions of results of coding rules checks and/or run-time checks that software verification tool 205 located in the source code. Check review section 730 may enable the user of software verification tool 205 to classify results of coding rules checks and/or run-time checks, and share the classified results with other users. Results summary section 740 may provide a list view of results of coding rules checks and/or run-time checks that software verification tool 205 located in the source code. Source code section 750 may include the source code for a check selected in results explorer section 710 and/or results summary section 740.

Figure 14:
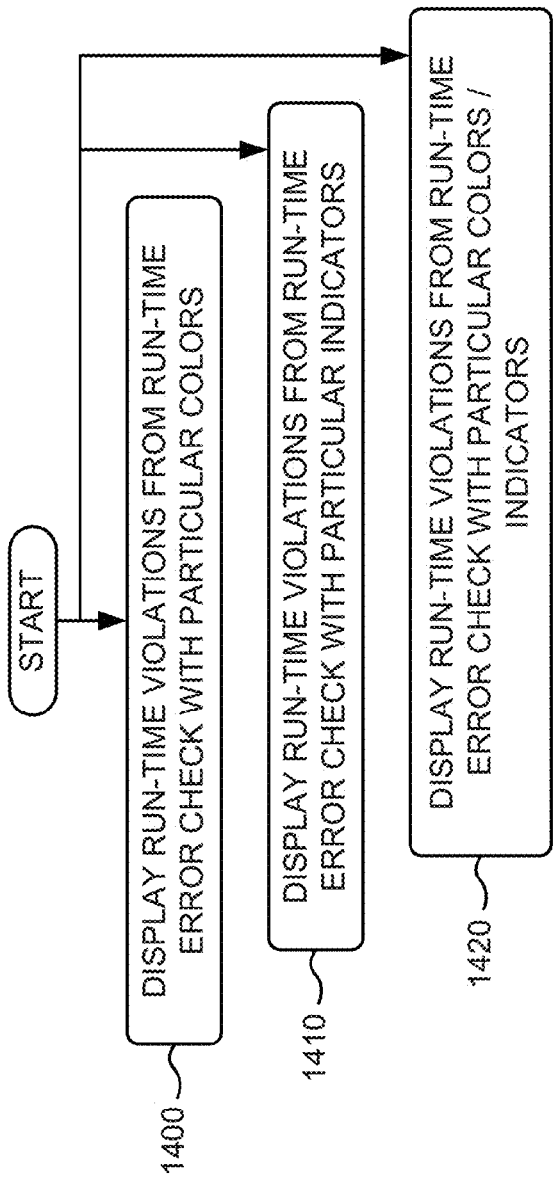

Process block 1240 may include the process blocks depicted in FIG. 14. As shown in FIG. 14, process block 1240 may include displaying the run-time violations from the run-time error check with particular colors (block 1400), displaying the run-time violations from the run-time error check with particular indicators (block 1410), and/or displaying the run-time violations from the run-time error check with particular colors and particular indicators (block 1420). For example, in an implementation described above in connection with FIG. 7, software verification tool 205 may utilize color coding of results to enable users to quickly identify errors (e.g., coding rules violations and/or run-time violations). Alternatively, or additionally, software verification tool 205 may utilize different identifiers to identify different errors (e.g., coding rules violations and/or run-time violations) in the source code. Alternatively, or additionally, software verification tool 205 may present results of checks for the coding rules violations and/or the run-time violations.

Process block 1250 may include the process blocks depicted in FIG. 15. As shown in FIG. 15, process block 1250 may include displaying the coding rule error violations from the results with particular colors (block 1500), displaying the coding rule error violations from the results with particular indicators (block 1510), and/or displaying the coding rule error violations from the results with particular colors and particular indicators (block 1520). For example, in an implementation described above in connection with FIG. 7, software verification tool 205 may utilize color coding of results to enable users to quickly identify errors (e.g., coding rules violations and/or results of checks for run-time violations). Alternatively, or additionally, software verification tool 205 may utilize different identifiers to identify different errors (e.g., coding rules violations and/or results of checks for run-time violations) in the source code.

Process block 1260 may include the process blocks depicted in FIG. 16. As shown in FIG. 16, process block 1260 may include displaying the coding rule warning violations from the results with particular colors (block 1600), displaying the coding rule warning violations from the results with particular indicators (block 1610), and/or displaying the coding rule warning violations from the results with particular colors and particular indicators (block 1620). For example, in an implementation described above in connection with FIG. 7, software verification tool 205 may utilize color coding of results to enable users to quickly identify errors (e.g., coding rules violations and/or run-time violations). Alternatively, or additionally, software verification tool 205 may utilize different identifiers to identify different errors (e.g., coding rules violations and/or run-time violations) in the source code.

CONCLUSION

Systems and/or methods described herein may provide an automated software verification tool that verifies software code (e.g., source code) by detecting coding rules violations and run-time errors. The systems and/or methods may analyze the source code to demonstrate compliance with established coding standards, such as, for example, MISRA-C:2004, MISRA AC AGC:2007, MISRA C++:2008, and JSF++:2005. To verify the source code, a user of the software verification tool may set up verification parameters in a project, execute the verification, and review the results. A graphical user interface provided by the software verification tool may help to efficiently configure a project, perform verification, and review verification results. The software verification tool may include a coding rules checker that may help users to improve the quality of the source code.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 12-16, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    performing, by one or more processors, a verification analysis of software code, the verification analysis comprising:
        a check of the software code based on coding standards,
        a check of the software code for a run-time error, or
        a check of at least part of the software code for an absence of errors;
    determining, by the one or more processors, properties of at least some execution paths of the software code to detect violations of the coding standards, possible occurrence of the run-time error, or the absence of errors; and
    providing, for display based on the verification analysis and by the one or more processors, results of the check of the software code based on the coding standards, results of the check of the software code for the run-time error, or results of the check of the at least part of the software code for the absence of errors comprising one or more of:
        generating a tree view for display, the tree view including a view of a violation associated with an error in the software code or a violation associated with a warning for the software code,
        generating a list view for display, the list view including a view of the violation associated with the error or the violation associated with the warning,
        generating a description for display, the description describing the violation associated with the error or the violation associated with the warning,
        associating an indicator with the software code for display, the indicator indicating the violation associated with the error, the violation associated with the warning, or the absence of errors in the at least part of the software code, or
        generating information for display, the information enabling a user to classify the violation associated with the error or the violation associated with the warning, or
        identifying the violation associated with the error or the violation associated with the warning.

2. The method of claim 1, wherein the coding standards comprise MISRA (Motor Industry Software Reliability Association) C, MISRA C++, or JSF (Joint Strike Fighter Air Vehicle) coding standards.

3. The method of claim 1, comprising providing a user with choices for the coding standards.

4. The method of claim 1, wherein the error comprises one or more of:
    an overflow,
    an underflow,
    an arithmetic error including division by zero,
    an out-of-bounds array access,
    illegally de-referenced pointers,
    read access to non-initialized data,
    dangerous data type conversion,
    dead code,
    deactivated code,
    access to null pointers,
    a dynamic error related to object programming and inheritance,
    an error related to exception handling,
    non-initialized class members in C++ language, or
    an impossible entry point synchronization error.

5. The method of claim 1, wherein the software code comprises model-based code.

6. The method of claim 5, wherein the model-based code is associated with a block diagram.

7. The method of claim 1, wherein the software code comprises graphical code.

8. The method of claim 7, wherein the graphical code comprises Statecharts code or unified modeling language (UML) code.

9. The method of claim 1, wherein the software code is automatically generated from a model.

10. The method of claim 1, comprising generating a unidirectional or bidirectional link between two different representations of the software code,
    at least one representation, of the two different representations, being associated with the violation associated with the error in the software code.

11. A system comprises:
    one or more processors to:
        perform verification analysis of software code,
            the verification analysis comprising:
                a check of the software code based on coding standards,
                a check of the software code for a run-time error, or
                a check of at least part of the software code for an absence of errors; and determine properties of at least some execution paths of the software code to detect violations of the coding standards, possible occurrence of the run-time error, or the absence of errors; and provide, for display and based on the verification analysis, results of the check of the software code based on the coding standards, results of the check of the software code for the run-time error, or results of the check of the at least part of the software code for the absence of errors, when providing the results of the check of the software code based on the coding standards, the results of the check of the software code for the run-time error, or the results of the check of the at least part of the software code for the absence of errors, the one or more processors are to:

generate a tree view for display, the tree view including a view of a violation associated with an error in the software code or a violation associated with a warning for the software code, generate a list view for display, the list view including a view of the violation associated with the error or the violation associated with the warning, generate a description for display, the description describing the violation associated with the error or the violation associated with the warning, associate an indicator with the software code for display, the indicator indicating the violation associated with the error or the violation associated with the warning, or the absence of errors in the at least part of the software code, or generate information for display, the information enabling a user to classify the violation associated with the error or the violation associated with the warning, or identifying the violation associated with the error or the violation associated with the warning.

12. The system of claim 11, wherein the coding standards comprise MISRA (Motor Industry Software Reliability Association) C, MISRA C++, or JSF (Joint Strike Fighter Air Vehicle) coding standards.

13. The system of claim 11, where the one or more processors are further to provide a user with choices for the coding standards.

14. The system of claim 11, wherein the error comprises one or more of:
an overflow,
an underflow,
an arithmetic error including division by zero,
an out-of-bounds array access,
illegally de-referenced pointers,
read access to non-initialized data,
dangerous data type conversion,
dead code,
deactivated code,
access to null pointers,
a dynamic error related to object programming and inheritance,
an error related to exception handling,
non-initialized class members in C++ language, or
an impossible entry point synchronization error.

15. The system of claim 11, wherein the software code comprises model-based code.

16. A non-transitory computer-readable medium storing instructions, the instructions comprising:

one or more instructions that, when executed by at least one processor, cause the at least one processor to:
perform verification analysis of software code, the verification analysis comprising:
a check of the software code based on coding standards,
a check of the software code for a run-time error, or
a check of at least part of the software code for an absence of errors; and determine properties of at least some execution paths of the software code to detect violations of the coding standards, possible occurrence of the run-time error, or the absence of errors; and provide, for display and based on the verification analysis, results of the check of the software code based on the coding standards, results of the check of the software code for the run-time error, or results of the check of the at least part of the software code for the absence of errors, the one or more instructions to provide the results of the check of the software code based on the coding standards or the results of the check of the software code for the run-time error comprise:

one or more instructions that, when executed by at least one processor, cause the at least one processor to:

generate a tree view for display, the tree view including a view of a violation associated with an error in the software code or a violation associated with a warning for the software code, generate a list view for display, the list view including a view of the violation associated with the error or the violation associated with the warning, generate a description for display, the description describing the violation associated with the error or the violation associated with the warning, associate an indicator with the software code for display, the indicator indicating the violation associated with the error, the violation associated with the warning, or the absence of errors in the at least part of the software code, or generate information for display, the information enabling a user to classify the violation associated with the error or the violation associated with the warning, or identifying the violation associated with the error or the violation associated with the warning.

17. The non-transitory computer-readable medium of claim 16, wherein the software code comprises graphical code.

18. The non-transitory computer-readable medium of claim 17, wherein the graphical code comprises Statecharts code or unified modeling language (UML) code.

19. The non-transitory computer-readable medium of claim 16, wherein the software code is automatically generated from a model.

20. The non-transitory computer-readable medium of claim 16, where the instructions further comprise:
one or more instructions that, when executed by at least one processor, cause the at least one processor to:

generate a unidirectional or bidirectional link between two different representations of the software code, at least one representation, of the two different representations, being associated with the violation associated with the error in the software code.

* * * * *